(12) United States Patent
Hall

(10) Patent No.: US 6,931,968 B2
(45) Date of Patent: Aug. 23, 2005

(54) DRIVE FOR AUTOMATED ASSEMBLY

(75) Inventor: Matthew C. Hall, Littleton, CO (US)

(73) Assignee: IMI Norgren, Inc., Littleton, CO (US)

( * ) Notice: Subject to any disclaimer, the term of this patent is extended or adjusted under 35 U.S.C. 154(b) by 3 days.

(21) Appl. No.: 10/612,584

(22) Filed: Jul. 1, 2003

(65) Prior Publication Data

US 2005/0000079 A1 Jan. 6, 2005

(51) Int. Cl.$^7$ .............................................. B25B 23/00
(52) U.S. Cl. ...................... 81/461; 156/580; 411/171
(58) Field of Search .............................. 81/58, 176.15, 81/441, 461, 475, 476; 156/580; 411/171

(56) References Cited

U.S. PATENT DOCUMENTS

| | | | | |
|---|---|---|---|---|
| 68,768 A | * | 9/1867 | McKinney ................... 403/314 |
| 2,202,240 A | * | 5/1940 | Trotter ....................... 81/124.6 |
| 2,697,370 A | * | 12/1954 | Brooks ........................... 81/58 |
| 3,134,292 A | * | 5/1964 | Walton ........................ 411/403 |
| 3,302,672 A | * | 2/1967 | Walton .......................... 81/461 |
| 3,446,688 A | | 5/1969 | Flax ............................ 156/423 |
| 3,599,857 A | | 8/1971 | Loyd et al. ...................... 228/2 |
| 3,897,896 A | | 8/1975 | Louw et al. ..................... 228/2 |
| 4,242,932 A | * | 1/1981 | Barmore ....................... 81/437 |
| 4,270,418 A | * | 6/1981 | Shephard ..................... 81/441 |
| 4,352,614 A | * | 10/1982 | Hirsch ......................... 411/427 |
| 4,477,307 A | * | 10/1984 | Cearlock et al. ............ 156/580 |
| 4,599,768 A | | 7/1986 | Doyle et al. ................... 24/590 |
| 4,635,773 A | | 1/1987 | Llewellin ...................... 192/46 |
| 4,840,291 A | * | 6/1989 | Merlin .......................... 221/59 |
| 5,449,077 A | | 9/1995 | Seidler ........................ 215/216 |
| 5,769,197 A | | 6/1998 | Kest et al. ..................... 192/46 |
| D397,612 S | | 9/1998 | Lipnick ........................ D9/445 |
| 5,875,694 A | * | 3/1999 | Graf ............................. 81/461 |
| 6,477,924 B1 | * | 11/2002 | Talbot ........................ 81/124.2 |

FOREIGN PATENT DOCUMENTS

GB  2217254 A  * 10/1989  ........... B29C/65/06

* cited by examiner

Primary Examiner—David B. Thomas
(74) Attorney, Agent, or Firm—Sheridan Ross P.C.

(57) ABSTRACT

A member for being joined to a mating member is provided. The member includes a number of drive sections that are engagable by a driver having corresponding driver sections. The rotation of the driver causes the member to be joined to the mating member. Each drive section can include a drive face body, a flat and a ramp. Each of them has an angular extent for desired contact with and engagement by the driver sections. The drive sections are integral with a drive support of the member. The drive sections can be located at a border section of the drive support. In one embodiment, the drive of the member is comprised of an inner drive and an outer drive. In another embodiment, the member is hollow. Different sized members can be joined to different mating members using the same driver. The drive is configured, particularly the ramp thereof, to substantially reduce unwanted removal of the member from the mating member.

25 Claims, 18 Drawing Sheets

DRIVE FOR AUTOMATED ASSEMBLY

FIELD OF THE INVENTION

The present invention relates to joining parts together and, in particular, to a member having a configuration that facilitates joining it to a mating part while reducing its ability to be disjoined.

BACKGROUND OF THE INVENTION

During certain assembly operations, it is common to join mating parts together using automated equipment. In one field involving fluidic, hydraulic and/or pneumatic parts, there can be one or more openings or exposed conduits or channels formed in the part through which fluid might pass or escape. Depending on the application, it may be necessary to block or close off one or more channels, ports and/or openings. To provide the closure, it is known to join a plug to such an opening of the mating part. This closure can be achieved using a number of different assembly techniques including rotating the plug to allow it to engage with a thread, lock into a closure or join through a friction weld. In one embodiment, the plug is rotated by engaging with a rotating driving tool. In addition to rotating the plug, the driving tool provides the force required to engage the plug with the mating part through the chosen assembly technique. Although joinder of plugs or other parts to mating parts has been implemented in different ways, for automated assembly applications, it would be advantageous to provide a plug or other member having drive or engaging portions that are readily and consistently contacted by the driving tool during the automatic assembly of the plug and the mating part. It would also be beneficial for the drive portions to be configured in order to enhance the tamper resistant properties of the plug. Additional aspects that would be worthwhile include a plug that is easily manufactured, such as by injection molding, and a universality property by which one driving tool could be used with a large number of different sized plugs.

SUMMARY OF THE INVENTION

In accordance with the present invention, a member or a part is provided for joining to a mating member or part. The member includes a drive support and a drive that is preferably integral with the drive support. The drive includes those portions that are engaged by a driving tool for rotating the member so that it is joined to the mating member. The drive can be comprised of a number of drive sections, with each being engaged or contacted when the member is rotated. In one embodiment, each drive section can include a drive face, a flat and a ramp. The drive face can include a drive face wall and a drive face body. The drive face body has an extent or a length that allows for desired rotation of the member without unwanted shearing or damage to the member. The flat is adjacent to the drive face wall and the ramp is adjacent to the drive face body. The ramp is inclined relative to the drive face material and the flat. In a preferred embodiment, the number of drive sections is three so that there are three drive faces, three flats and three ramps. Preferably, the drive is formed or provided along a border section of the drive support. In the embodiment in which the border section is at the outermost portion of the drive support, the drive integrally extends from this border section and the profile of the drive adds to or is part of the total height of the member.

The combination of the drive and the drive support can be defined as having an outer edge or wall and an inner edge or wall. Defined within this inner wall is a bounded segment that has a width or diameter. The drive face material also has a width, which is less than one-half of the bounded segment width. The bounded segment can receive portions of the driving tool.

The drive support can also be defined as having a center axis that extends through its center, particularly the center of the bounded segment. Each of the ramp, drive face and flat have an angular extent or portion of a circumference that is defined using the center axis. More specifically, each of the ramp, drive face and flat have an angular extent that extends from the center axis. In the preferred embodiment, the ramp angular extent is in the range of 35°–55°, the drive face angular extent is in the range of 30°–50°, and the flat angular extent is in the range of 25°–45°.

Another embodiment of the member includes a drive support that has two or more section borders. Integral with a first section border is a first or inner drive and integral with a second section border is a second or outer drive. The outer drive is located radially outwardly from the inner drive and with an annulus or gap of the drive support located therebetween. In this embodiment, the drive sections of the inner drive are radially aligned with the drive sections of the outer drive. The width or size of the member having inner and outer drives is typically greater than most members that have a single drive.

With respect to the member to be rotated being combined or used with a driving tool, the driving tool can include a body and an outer surface area integral therewith, together with a boss positioned centrally in the outer surface area. The outer surface area includes a driver having driver sections that correspond to the drive sections of the member to be rotated. The boss can fit into the bounded segment of the member. Due to the driver sections corresponding to the drive sections, the driver can be easily, automatically manipulated to engage the drive sections. In one embodiment, the driver can include an inner driver and an outer driver. Essentially, the inner driver is formed or provided on an outer surface area or end of a centrally located hub extending from the body of the driver. The outer driver is provided radially outwardly from this hub. Both the inner driver and the outer driver have driver sections corresponding to drive sections of one or more members. This embodiment of a driver has particular utility when used to rotate a hollow member in which the bounded segment is open whereby the inner driver can be located within the bounded segment and could even extend past the bounded segment. The outer driver is used to engage and rotate the drive of the hollow member.

Regarding use or operations associated with the members of the present invention, members of different sizes can be caused to rotate and thereby be joined to different mating parts or members using the same driver. For example, a two-inch driver could drive plugs or other members with diameters ranging from 3.175 mm (one-eighth inch) to 305 mm (12 inches). This is achievable due to the common angles found with the drive sections and the driver sections. In connection with automated assembly operations, the size of the member to be joined to the mating member can be changed without changing the driver.

Based on the foregoing summary, a number of salient features of the present invention are identifiable. A member is provided with a drive having a configuration that is readily engaged or contacted by a driver for rotating the member, particularly in automated assembly operations. Different sizes of members with drives can be rotated with the same driver. The members can also be hollow or, alternatively, have more than one drive. Each drive has a number of drive sections configured and arranged in a way to enhance resistance to tampering. In one embodiment, a ramp is included that essentially causes removal of the driving tool attempting to rotate the member in a direction opposite that of securing or tightening the member to the mating part. The member can be joined to a variety of mating parts or members, including those involved with fluid control or movement.

Additional advantages of the present invention will become readily apparent from the following discussion, particularly when taken together with the accompanying drawings.

DETAILED DESCRIPTION

Figure 1:
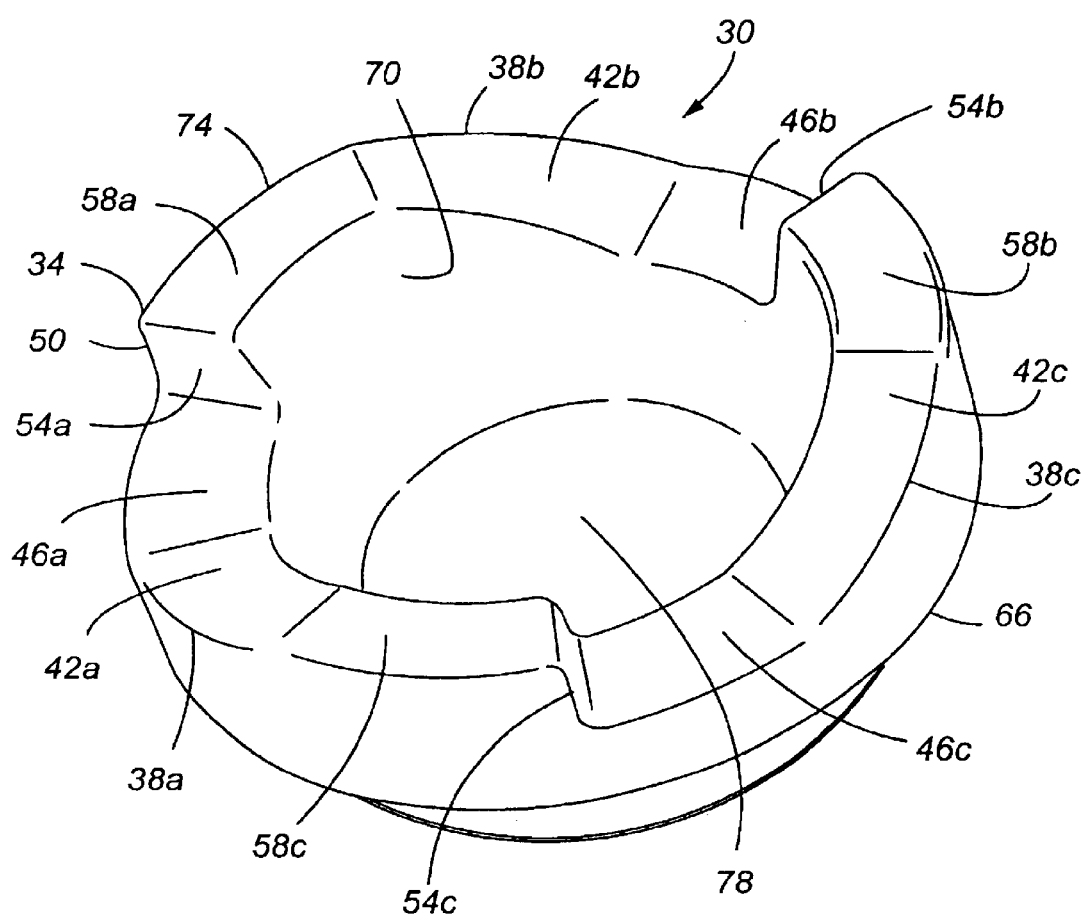
FIG. 1 is a perspective view of a member of the present invention.

With reference to FIG. 1, a member or part 30 for being joined to a mating member or part is illustrated. The member 30 has a drive 34 that is engagable by a driver of a driving tool in order to rotate the member 30. In the embodiment of FIG. 1, the drive 34 is formed or located along a periphery of the member 30. In a preferred embodiment, the drive 34 is comprised of a number of drive sections 38. Most preferably, there are three drive sections 38a, 38b, 38c. Each of the drive sections 38 preferably has three elements, namely a ramp 42, a flat 46 and a drive face 50. The drive face 50 is defined as having a drive face wall 54 and a drive face body 58. In the embodiment having three drive sections 34, there are three ramps 42a, 42b, 42c; three flats 46a, 46b, 46c; three drive face walls, 54a, 54b, 54c; and three drive face bodies 58a, 58b, 58c. The three drive faces 50 are equally spaced and tangent to the diameter of the member 30. The three drive faces 50 provide more drive area than a minimum of two drive faces, but provide easier engagement than four or a greater number of drive faces. Limiting the number of drive faces 50 to three also allows for significant drive face body 58 around the diameter to support the drive face 50 thereby increasing the force that can be applied to the drive face 50 before shearing it away from the rest of the member 30.

Each of the ramps 42 and flats 46 allows the driving tool to engage with the drive faces 50. Each flat 42 also allows the driving tool to be supported by more material to increase the force that can be applied to the drive faces 50 of the member 30. The ramp 42 and the flat 46 constitute a rapid engagement system to allow a driving tool that is spinning to engage with the member 30. Consequently, no alignment between the member 30 and the driving tool is required before they come into contact. On the other hand, configurations which require pre-alignment are more expensive to operate and have longer cycle times. As well as allowing quick engagement, each ramp 42 also prevents anti-clockwise rotation that would cause disengagement. Therefore, it acts as a tamper resistant mechanism. This can be useful in certain applications where tampering with a mechanism must be avoided. As each ramp 42 of the member 30 engages with a driving tool, the resulting forces are upwards and force the driving tool to disengage from the member 30. This geometry means that there are no common tools in circulation that could be used to attempt to disengage a member 30 by rotating it anti-clockwise. This also reduces the chance that a member 30 with this drive 34 can be tampered with.

The depth of the drive face walls 54a, 54b, 54c is about 1.5 mm+5 mm/−1 mm for most sized members 30. For very large sized members 30 (e.g. having diameters above three inches), the depth may be increased beyond this typical depth to allow higher forces to be transmitted through the drive faces 50. The widths of the drive faces 50 are determinable by the manufacturing process used to produce the member 30 and can be any magnitude from 0.75 mm to the full radius of the member 30. Preferably, the widths of the drive faces 50 can be made relatively small in comparison to the total diameter of the member 30. Similarly, the depths of the drive faces 50 can be made relatively small to create a low profile drive 34.

Each of the drive face walls 54a, 54b, 54c are substantially vertical, or form a 90° angle with the respective adjacent flat 46a, 46b, 46c. Similarly, each drive face body 58a, 58b, 58c is substantially perpendicular to its respective, adjacent drive face wall 54a, 54b, 54c, while being substantially parallel to the particular flat 46 of its drive section 38.

The member 30 also has a drive support 66 that can be integral with the drive 34. The drive support 66 has a height and combines with the profile of the drive 34 to define a total height of the member 30. The member 30 also has an inner edge or wall 70 and an outer edge or wall 74. In the embodiment of FIG. 1, the outer wall is the outermost portion of the member 30 and is a combination of outer portions of the drive 34 and outer portions of the drive support 66. The inner wall 70 is also made up of portions of the drive 34 and the drive support 66. A bounded segment 78 of the member 30 is defined within the inner wall 70. In the embodiment of FIG. 1, the bounded segment 78 is closed by closure portions of the bounded segment 78. These closure portions are also defined to be part of the drive support 66.

Figure 2:
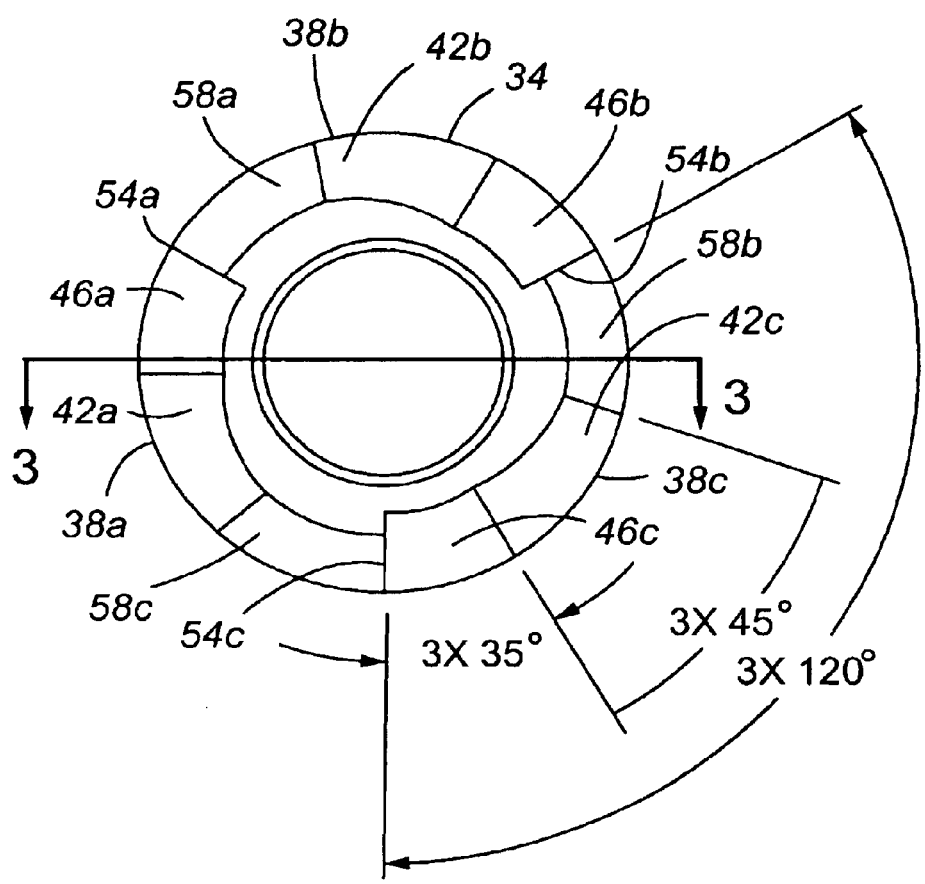
FIG. 2 is a top plan view of the member of FIG. 1 illustrating drive sections and the angular extents associated therewith.
Figure 3:
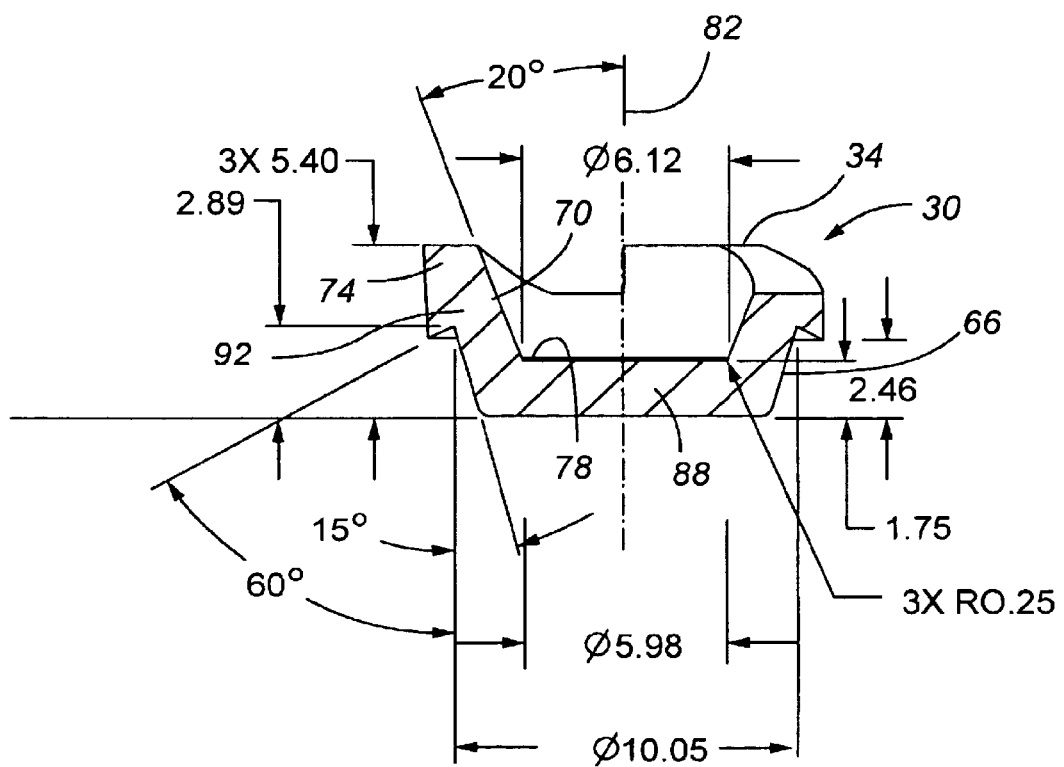
FIG. 3 is a cross-sectional view of the member of FIG. 1.

With reference to FIGS. 2 and 3, additional descriptions of the member 30 are provided. As seen in FIG. 2, start and end points can be identified for each of the ramps 42, flats 46, and drive face bodies 58. These points are defined by predetermined angles. In particular, a center axis 82 (FIG. 3) can be defined as extending through the center of the drive support 66. Each ramp 42 has an angular extent extending from the center axis 82. Each flat 46 also has an angular extent extending from the center axis 82. The angular extent of each ramp 42 is preferably greater than the angular extent of each drive face body 58 and the angular extent of each drive face body 58 is preferably greater than the angular extent of each flat 46. More preferably, the ramp angular extent is in the range of 35°–55°, the drive face body angular extent is in the range of 30°–50° and the flat angular extent is in the range of 25°–45°. Most preferably, the ramp angular extent is about 45°, the drive face body angular extent is about 40°, and the flat angular extent is about 35°. The drive profile or height is less than one-half of the height of the drive support 66.

Referring more specifically to FIG. 3, the drive support 66 can be defined as having a base 88 that terminates at the closure portions of the bounded segment 78 and an intermediate 92 between the bottom of the drive 34 and the closure portions of the bounded segment 78. Preferably, the drive 34, the intermediate 92 and the base 78 constitute one piece.

The drive 30 could be formed from any material. However, in injected molded plastic parts, it has the additional advantage of being moldable without significantly increasing wall thicknesses that otherwise might induce warpage, sink marks or other defects. This is due to having a significant lengths of drive face bodies 58 thereby allowing a relatively high force to be applied to the drive 34 without increasing the width of the drive face bodies 58 and, accordingly, reducing the wall thickness of the member 30.

Figure 4:
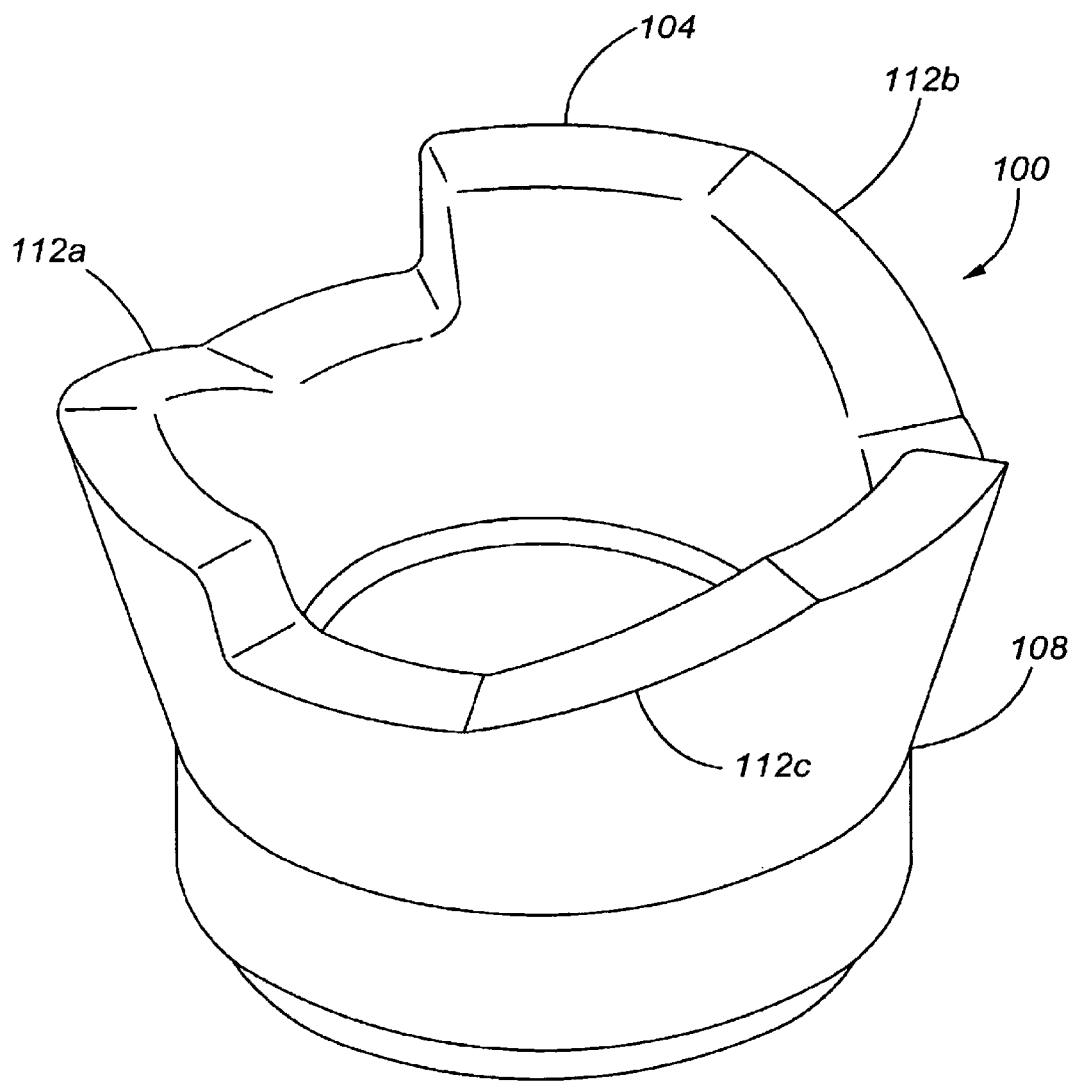
FIG. 4 is a perspective view illustrating another member smaller in size than that of the member of FIG. 1.

Referring to FIG. 4, a feature of the present invention related to members of different sizes is illustrated. A member 100, such as a plug, is depicted which is smaller in size than the embodiment of FIGS. 1–3. That is, the width or diameter of the member 100 is less than that illustrated in FIGS. 1–3. However, the design or configuration of FIG. 4 is comparable to that of the previous embodiment. More specifically, the member 100 has a drive 104 and a drive support 108 integral therewith. The drive 104 has three drive sections 112a, 112b, 112c. Each of the drive sections 112a, 112b, 112c is comprised of a ramp, a flat, a drive face wall and a drive face body. Furthermore, the locations or positions of the elements of the drive sections 112a, 112b, 112c can be equivalent in their angular extent to that illustrated in FIG. 2 and as previously described.

Figure 5:
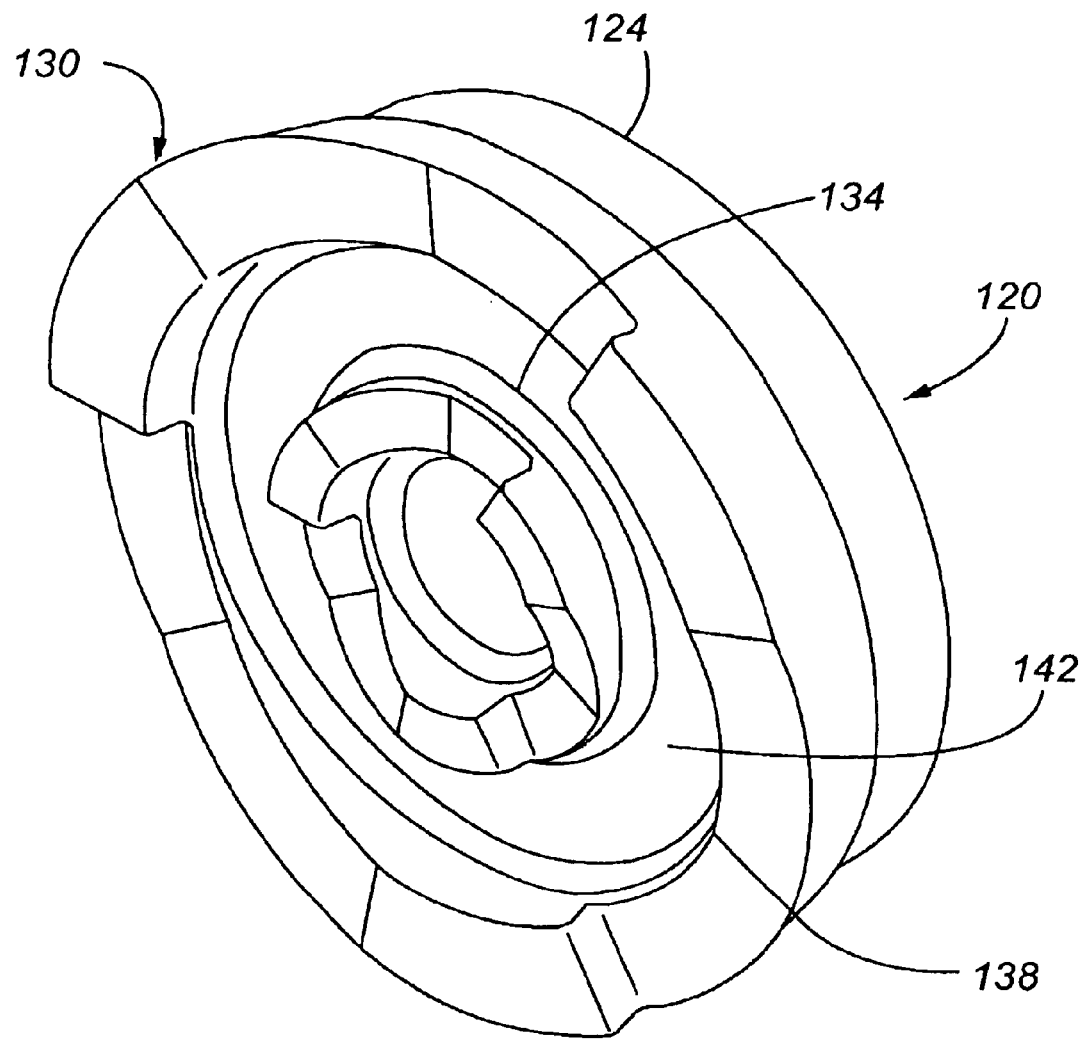
FIG. 5 is a perspective view of a member having an inner drive and an outer drive.
Figure 6:
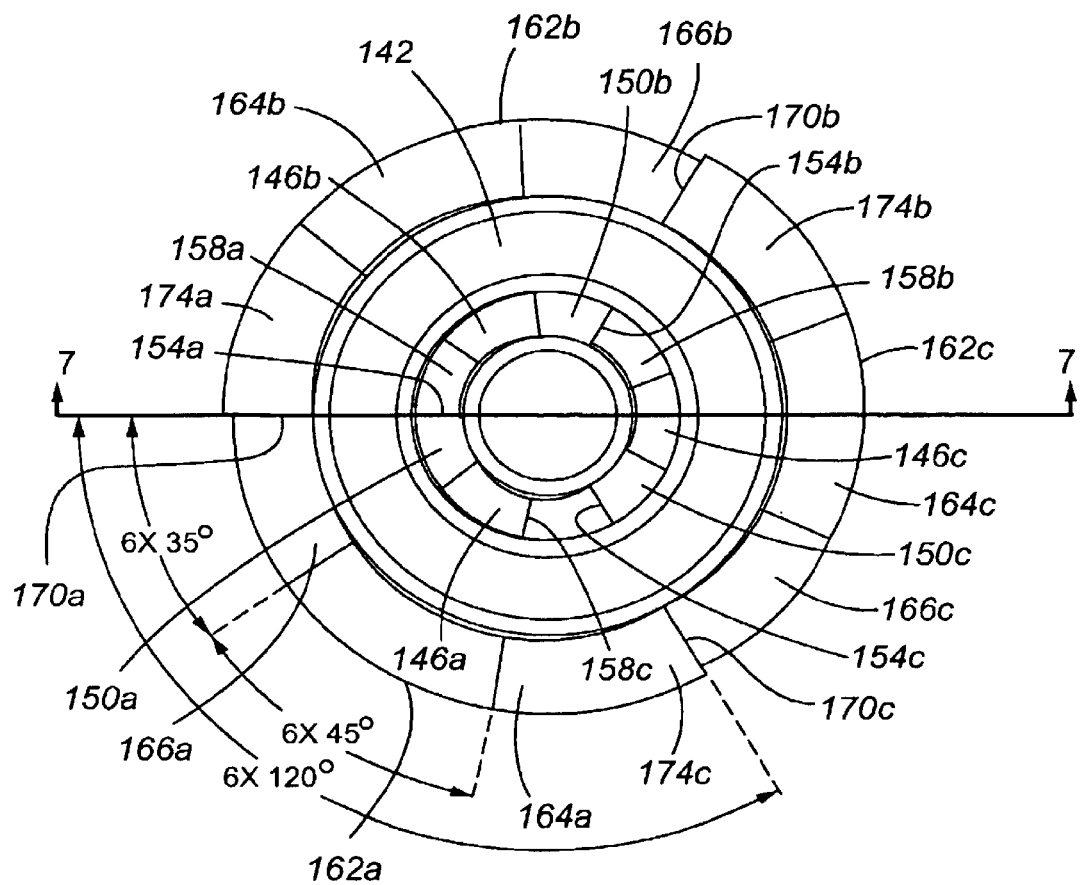
FIG. 6 is a top plan view of the member of FIG. 5.
Figure 7:
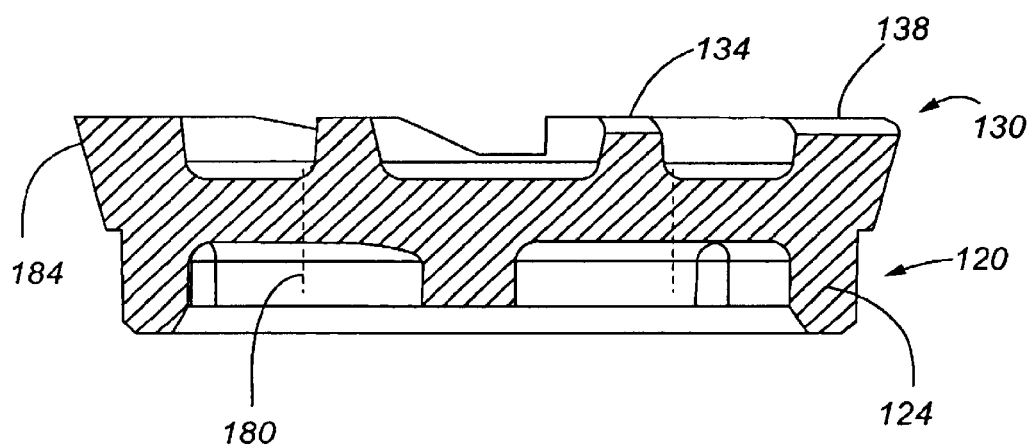
FIG. 7 is a cross-sectional view of the member of FIG. 5.

Another embodiment and being of a different size is the member or plug 120 illustrated in. FIGS. 5–7. The member 120 has a drive support 124 and a drive 130 that is characterized by a first or inner drive 134 and a second or outer drive 138. An annulus or gap 142 is disposed between the inner and outer drives 134, 138. The annulus 142 constitutes a common wall thickness that minimizes warpage or other molding defects of the member 120, particularly where the annulus 142 is equal to or greater than the width of one or both of the inner and outer drives 134, 138.

As depicted in FIG. 6, the inner drive 134 has three drive sections, with each of the drive sections having one of the ramps 146a, 146b, 146c. Each of the drive sections has one of the flats 150a, 150b, 150c. Each drive section also has a drive face wall and a drive face body 154a, 158a; 154b, 158b; 154c, 158c, respectively.

The outer drive 138 that is spaced from the inner drive 134 by the annulus 142 has three drive sections 162a, 162b, 162c. The drive section 162a is comprised of ramp 164a, flat 166a, drive face wall 170a and drive face body 174a. The drive section 162b is comprised of ramp 164b, flat 166b, drive face wall 170b and drive face body 174b. The third drive section 162c is comprised of ramp 164c, flat 166c, drive face wall 170c, and drive face body 174c. As can be seen in FIG. 6, each of the three drive sections of the inner drive 134 is aligned with a corresponding drive section of the outer drive 138. In that regard, each of the elements of the drive sections, including its ramp, flat, drive face wall and drive face material, is aligned with a corresponding ramp, flat, drive face wall and drive face material of the outer drive 138. Like the embodiment previously described in connection with FIG. 1, these elements or parts of the drive sections have predetermined angular extents, which were provided in the discussion of FIG. 2.

As seen in FIG. 7, the drive support 124 can be defined as having a first section border 180 that extends vertically downwardly from the outer wall or edge of the inner drive 134. Essentially, the first section border 180 terminates those portions of the drive support 124 that are supporting or underlying the inner drive 134. Similarly, the drive support 124 can be defined as having a second section border 184 that constitutes the outermost edge or portion of the member 120, including its drive support 124. Although this embodiment illustrates two separated drives 134, 138, a related embodiment could be devised whereby the inner drive 134 and the outer drive 138 merge to a single drive. In that configuration, a substantial amount of force can be transmitted through such a drive.

Figure 8:
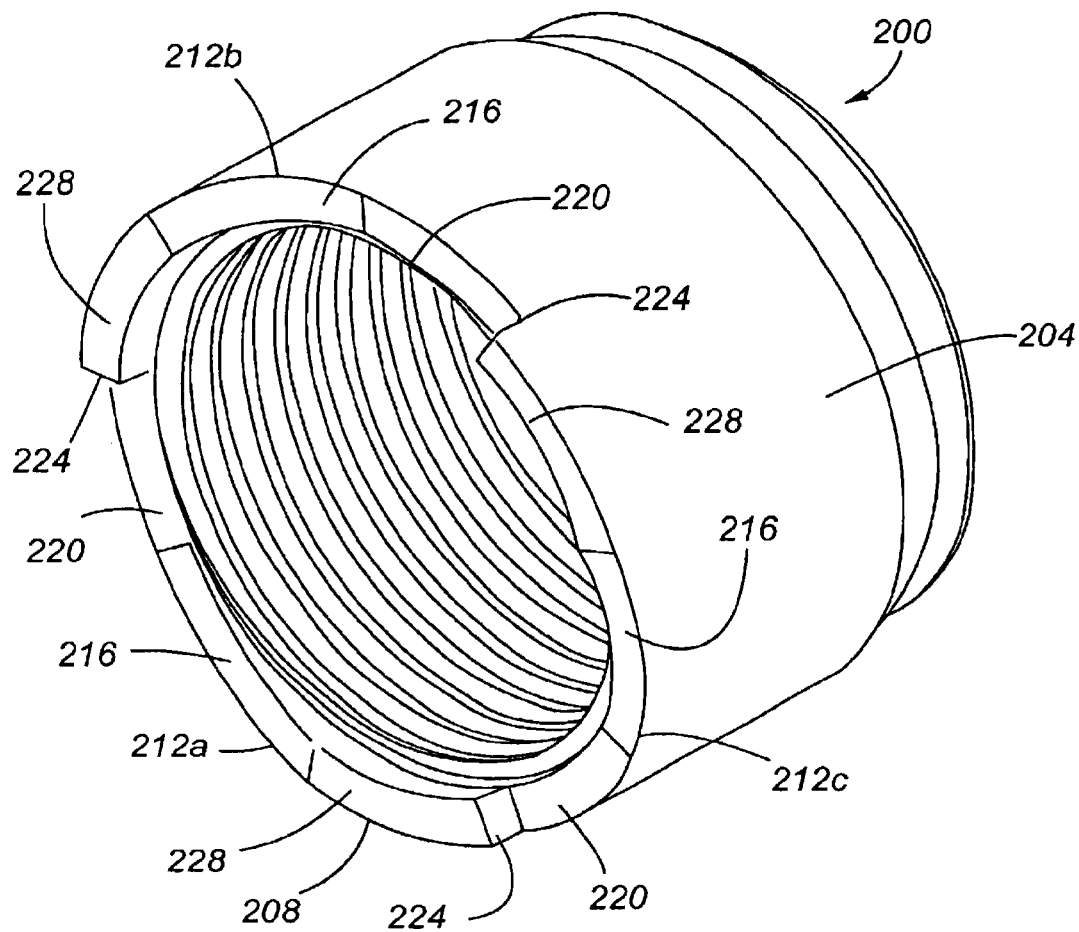
FIG. 8 is a perspective view of a hollow member.
Figure 9:
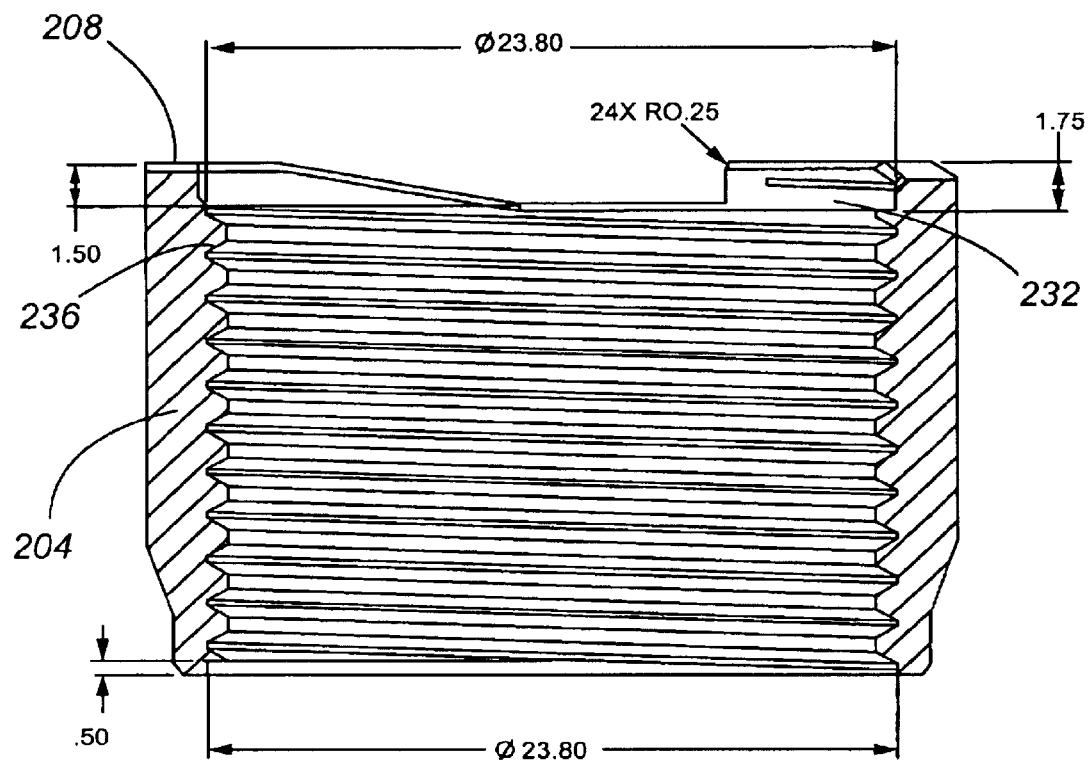
FIG. 9 is a cross-sectional view of the member of FIG. 8.

Referring next to FIGS. 8 and 9, another embodiment of a member or plug 200 is illustrated. According to this embodiment, the member 200 is threaded and has a hollow body. More particularly, the member 200 includes a drive support 204 and a drive 208. The drive 208 is located or provided integral with the drive support 204 and extends from its periphery at one end of the drive support 204. Like the other embodiments, the drive 208 includes a number of drive sections 212a, 212b, 212c. Each of the drive sections 212a, 212c has elements or parts that are comparable or equivalent to the previously described drive sections in the other embodiments, including ramps 216, flats 220, drive face walls 224 and drive face bodies 228.

This embodiment is particularly characterized by a bounded segment 232 (FIG. 9) located within the drive 208 that is hollow or open throughout the height of the member 200. The inner wall or edge 236 is also threaded throughout, or substantially throughout, the height of the drive support 204, as also seen in FIG. 9. In this embodiment, the member 200 is able to receive another part that is threaded to it, which can block or seal off the open area or hollow defined inwardly of the drive 208. The drive 208 is particularly suited to tube sections where there is only a small surface, e.g., the wall of the tube, on which to locate the drive 208.

Figure 10:
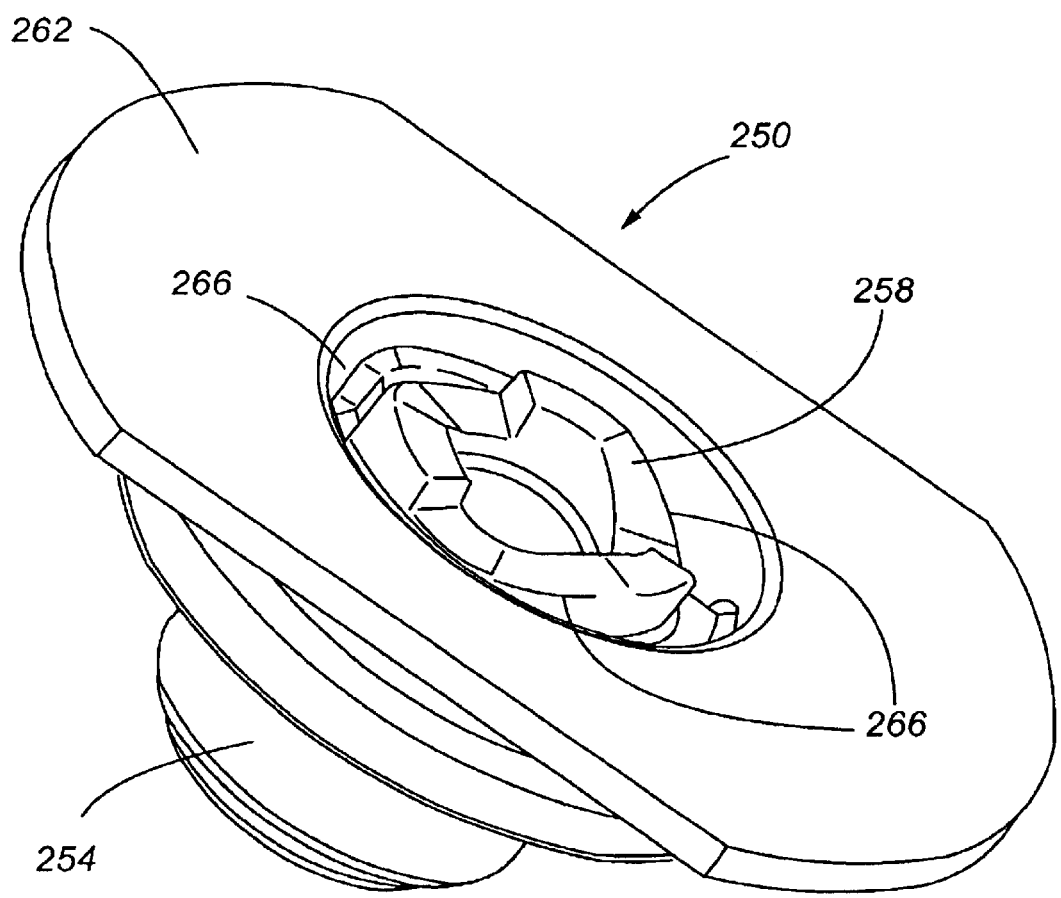
FIG. 10 is a perspective view of a member having a flange adjacent to the drive thereof.
Figure 11:
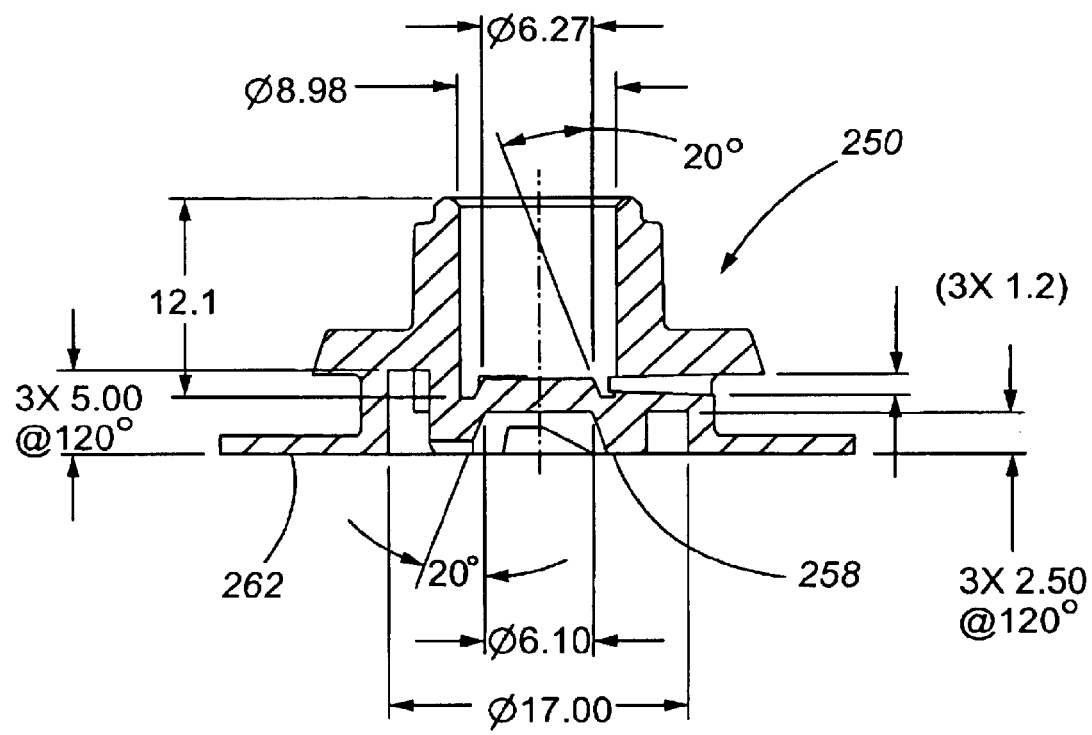
FIG. 11 is a cross-sectional view of the member of FIG. 10.

As illustrated in FIGS. 10 and 11, another embodiment of a member 250, such as a plug, is illustrated. The member 250 includes a drive support 254 and a drive 258. This embodiment also has a flange 262, or an additional or extension element located or formed adjacent to the drive 258. The flange 262 is located outward of the drive 258 such that the drive 258 is situated in the center of the member 250 and portions of the flange 262 extend outwardly therefrom.

The member 250, including flange 262, may have utility in properly engaging or mating with another part to which the member 250 is to be joined. Like other embodiments, the drive 258 has a number of drive sections 266, preferably three drive section 266. Each of the drive sections 266 has the same elements of a ramp, a flat, a drive face wall and a drive face body, as described in the other embodiments.

Figure 12:
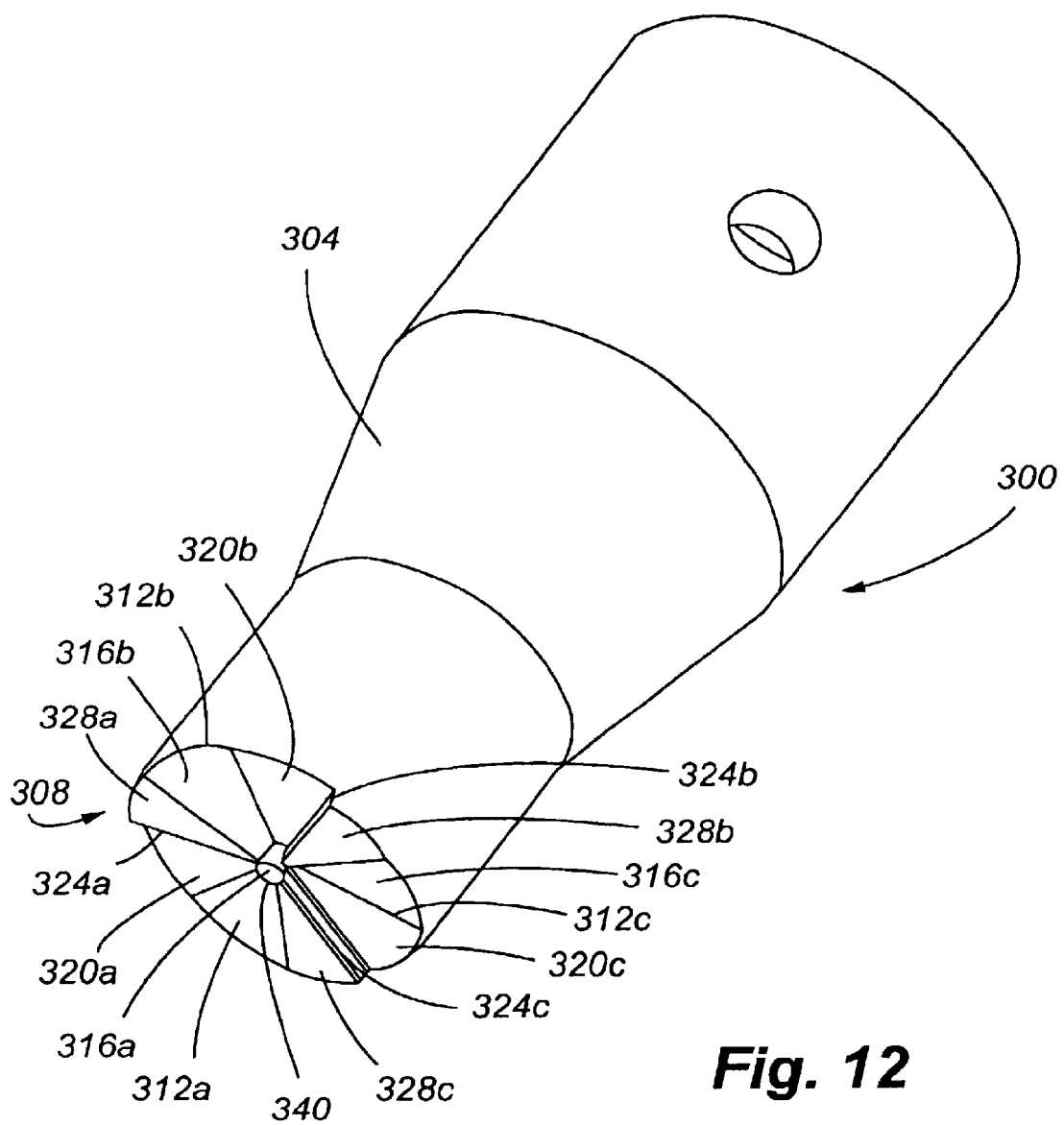
FIG. 12 is a perspective view of a driving tool that can be used to rotate a number of members of different sizes.

With reference to FIG. 12, one embodiment of a driving tool 300 is next described. The driving tool 300 is used to join at least one of the members previously described to another mating member or part. The driving tool 300 can be part of another assembly or automated equipment that is automatically controlled to move and/or rotate the driving tool 300. By way of example, the driving tool 300 can be automatically positioned to engage or contact with a particular member and then cause it to rotate in order to join the member to a mating member. In one particular embodiment, the driving tool 300 can be associated with a spin welding procedure by which the member is caused to rotate by the driving tool 300 and is spin welded to the mating part.

The driving tool 300 has a body 304 and, at one end thereof, a driver 308 is provided. The driver 308 has as number of parts that are shaped or configured to correspond and properly engage with one or more members, such as those previously described. The driver 308 is configured to drive virtually any sized member having drive sections of members of previously described embodiments. The driver 308 has a number of driver sections that correspond to previously described drive sections. In the case of the embodiments of members with three drive sections, the driver 308 has three driver sections 312a, 312b, 312c. The driver section 312a has a driver ramp 316a, a driver flat 320a, a driver face wall 324a and a driver face body 328a, all of which are shaped to suitably engage a corresponding one of the ramp, flat, drive face wall and drive face body of a corresponding drive section. Likewise, driver ramp 316b, driver flat 320b, driver face wall 324b, and driver face body 328b are provided to engage a corresponding another one of the member drive sections, while driver ramp 316c, driver flat 320c, driver face wall 324c and driver face body 328c are provided to engage the third drive section of the member.

The driving tool 300 also has a center boss or pin 340 extending from the central axis of the body 304. The center boss 340 is sized and configured to fit within the previously described member bounded segment. The radial extents of the parts of the drive sections 312a–312c are such that the driver 308 can mate and work with a number of members having different sizes or diameters, such as the different sized members of FIGS. 1–3 and 4–5. Accordingly, when the driving tool 300 is part of automated equipment, it need not be replaced by different sized drivers when the size of the plug or member that is being joined to a mating part is changed.

Figure 13:
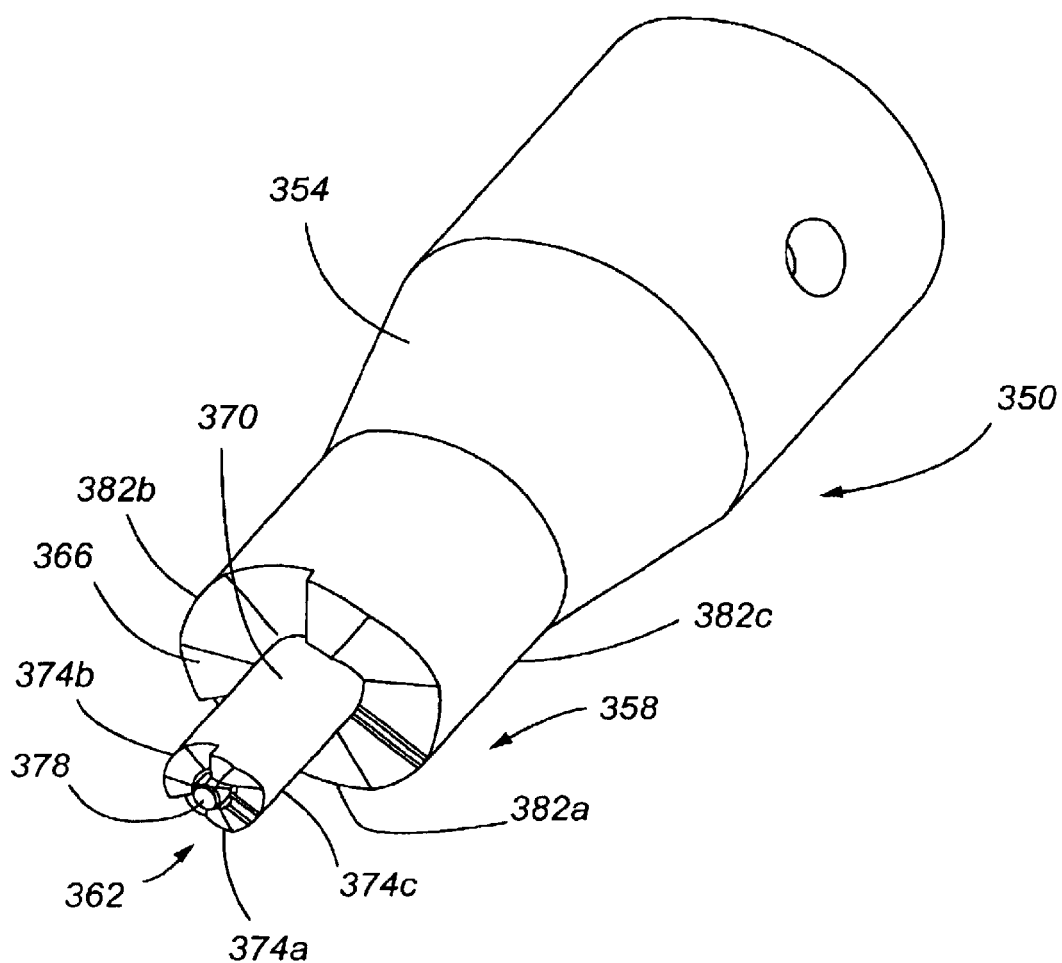
FIG. 13 is a perspective view of a driving tool having an inner driver and an outer driver.

Another embodiment of a driving tool 350 is illustrated in FIG. 13 and includes a body 354 having a driver assembly 358 at one end thereof. The driver assembly 358 includes an inner driver 362 and an outer driver 366 extending radially outwardly from the inner driver 362. The inner driver 362 is provided or supported on a hub 370 so that there is a longitudinal distance between the inner driver 362 and the outer driver 366. Each of the inner driver 362 and outer driver 366 has a number of driver sections for engaging drive sections of one or more members including those previously described.

The inner driver 362 has inner driver sections 374a, 374b, 374c. Each of the inner driver sections 374a, 374c has a number of elements that correspond or function with parts of member drive sections so that proper engagement and rotation of the member can occur. That is, like the embodiment of FIG. 12, the inner driver sections each have a driver ramp, a driver flat, a driver face wall and a driver face body. Projecting from the center of the inner driver 362 is a center boss or pin 378 that can be inserted into a bounded segment of a selected one of different sized members.

Figure 14:
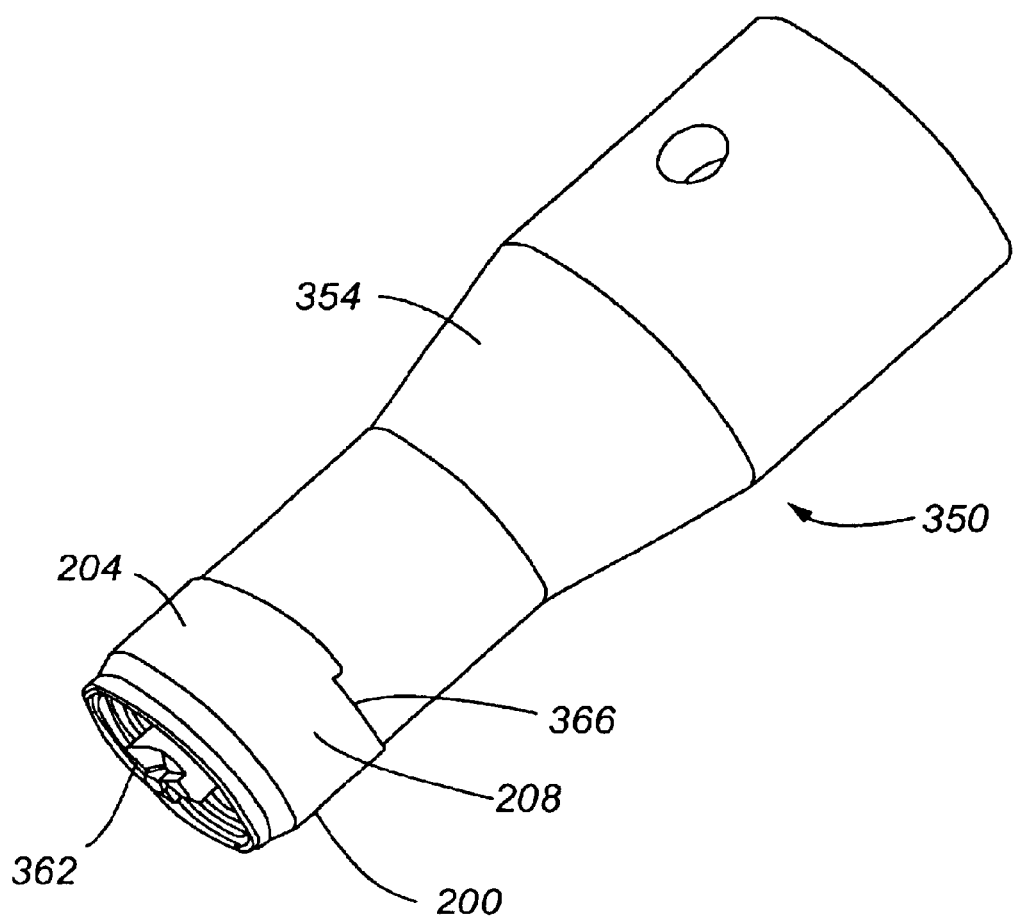
FIG. 14 is a perspective view illustrating the outer driver of FIG. 13 engaging the hollow member of FIG. 8.

Like the inner driver 362, the outer driver 366 has a number of driver sections, preferably three, 382a, 382b, 382c. Each of these outer driver sections also has a driver ramp, a driver flat, a driver face wall and a driver face body of suitable sizes and angular extents for desired engagement with certain drive sections of one or more members, including those previously described. In that regard, the outer driver 366 has particular utility in engaging the drive of a hollow member or plug, such as the drive 208 of the member 200 illustrated in FIGS. 8 and 9. This engagement of the outer drive 208 by the outer driver 366 is depicted in FIG. 14. As this embodiment also illustrates, due to the hollow nature and openness of the bounded segment 232 of the member 200, the hub 370 and the inner driver 362 extend a significant distance into the member 200, including more than one-half the height of the member 200. Once the member 200 is joined to a mating member by means of its rotation using the driving tool 350, the driving tool 350 can be disengaged or separated from the member 200.

Figure 15:
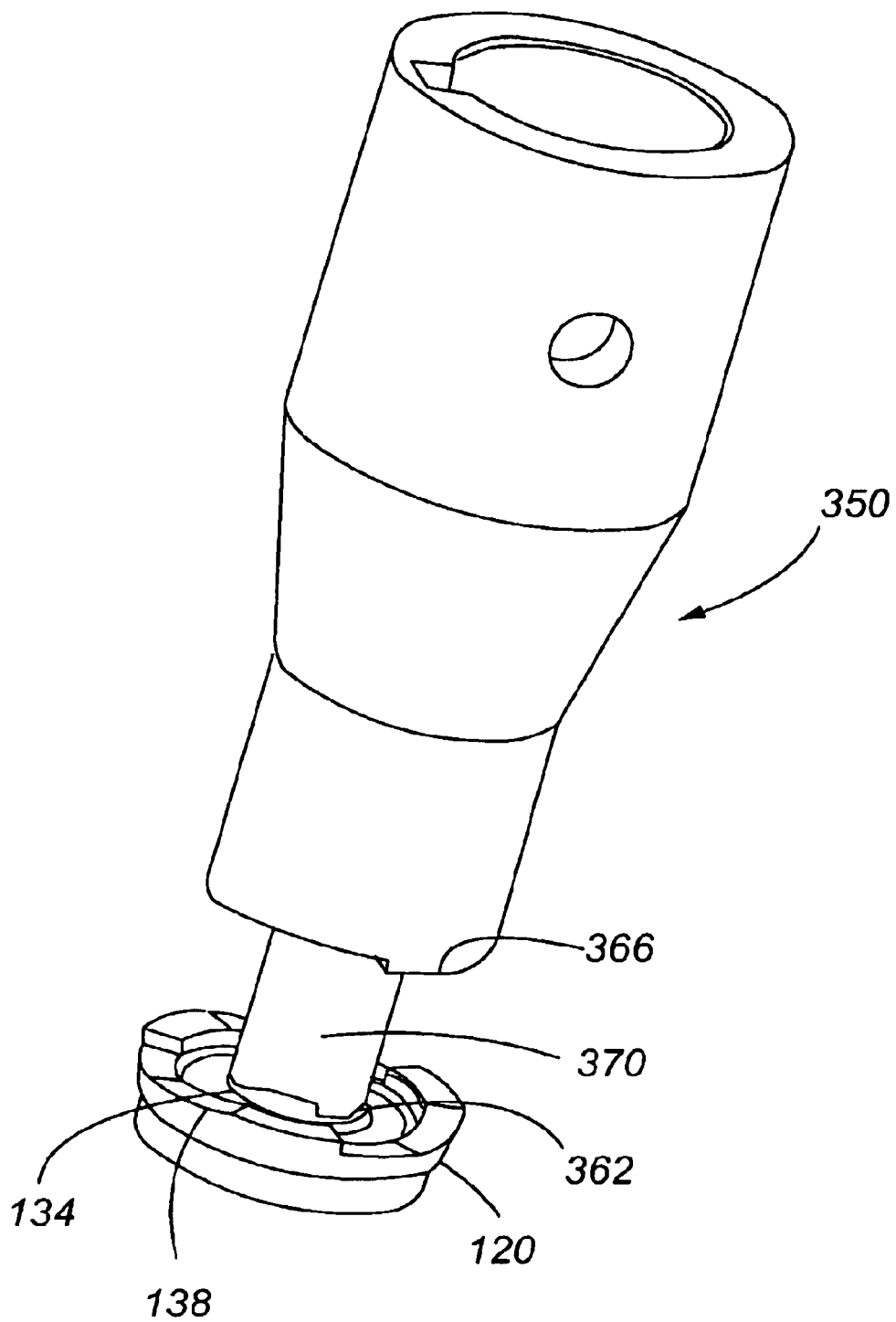
FIG. 15 is a perspective view illustrating the inner driver of FIG. 13 engaging the member of FIG. 5.
Figure 16:
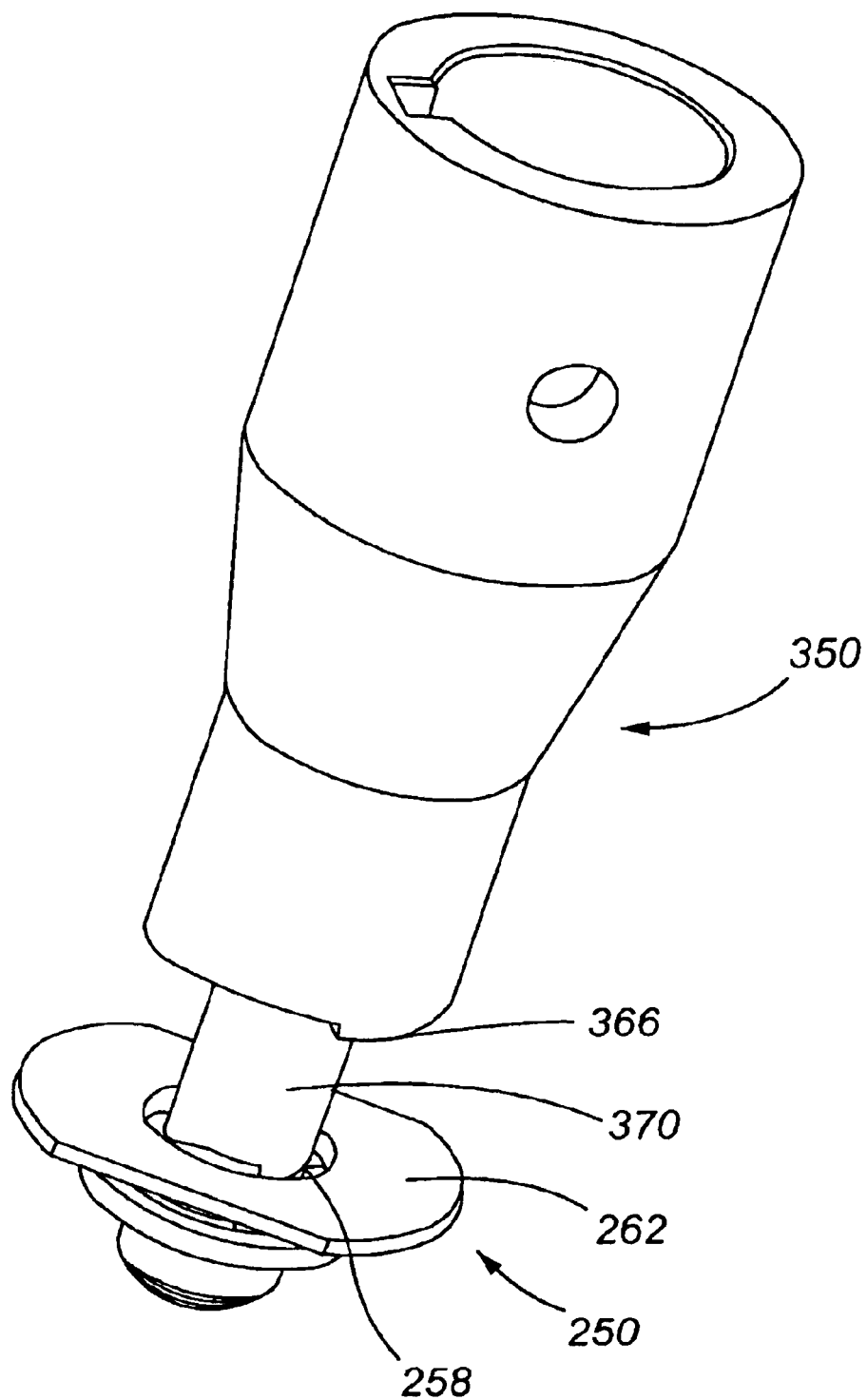
FIG. 16 is a perspective view illustrating the inner driver of FIG. 13 engaging the member of FIG. 10.

Referring to FIGS. 15 and 16, further applications of the driving tool 350 of FIG. 13 are described. As seen in FIG. 15, the driving tool 350 is used to engage the member 120 of FIGS. 5–7. In particular, the inner driver 362 engages the inner drive 134 of the member 120. As can be seen, the outer driver 366 remains spaced from the member 120 essentially by the length of the hub 370.

Referring to FIG. 16, the driving tool 350 can also engage and cause the member 250 to rotate, which was previously described in connection with FIGS. 10 and 11. As depicted, the inner driver 362 engages the drive 258 that is centered within the flange 262.

Figure 17:
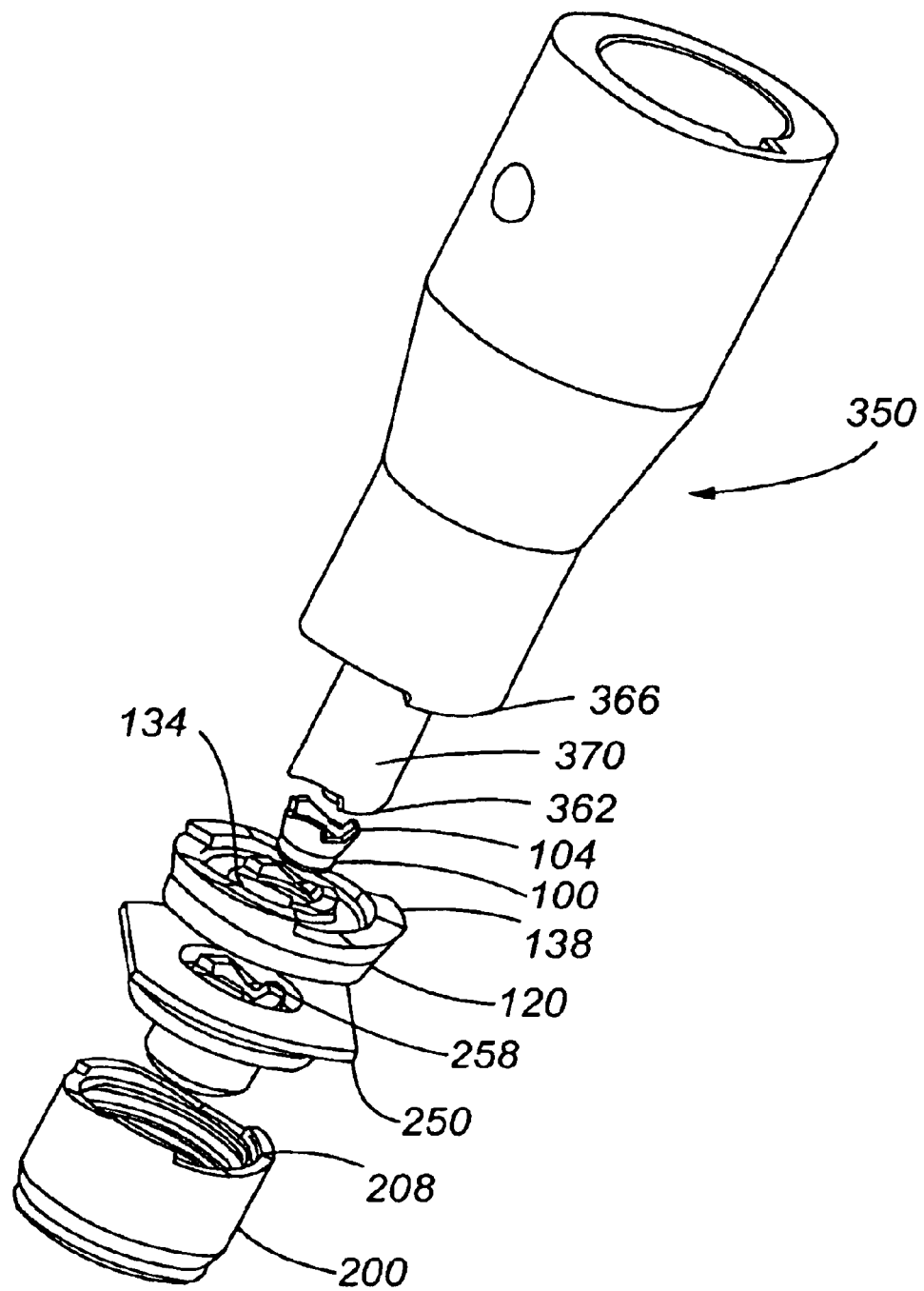
FIG. 17 is an exploded view illustrating the driving tool of FIG. 13 that can be used to drive a number of differently configured members.

With reference to FIG. 17, a schematic compilation of different shapes and sizes of members or plugs that can be used with the driving tool 350 is illustrated. In particular, the driver 362 of the driving tool 350 can matingly engage the drive 104 and cause the member 100 to rotate in a desired direction, such as clockwise. Likewise, the driver 362 is capable of matingly engaging with the inner drive 134 of the member or plug 120 so that it also can be caused to rotate in the desired direction. Further, the driver 362 of the driving tool 350 can matingly engage the drive 258 of the member 250 in order to cause it to desirably rotate. Lastly, the outer driver 366 of the driving tool 350 can engage the drive 208 of the member or plug 200 to cause it to rotate.

Figure 18:
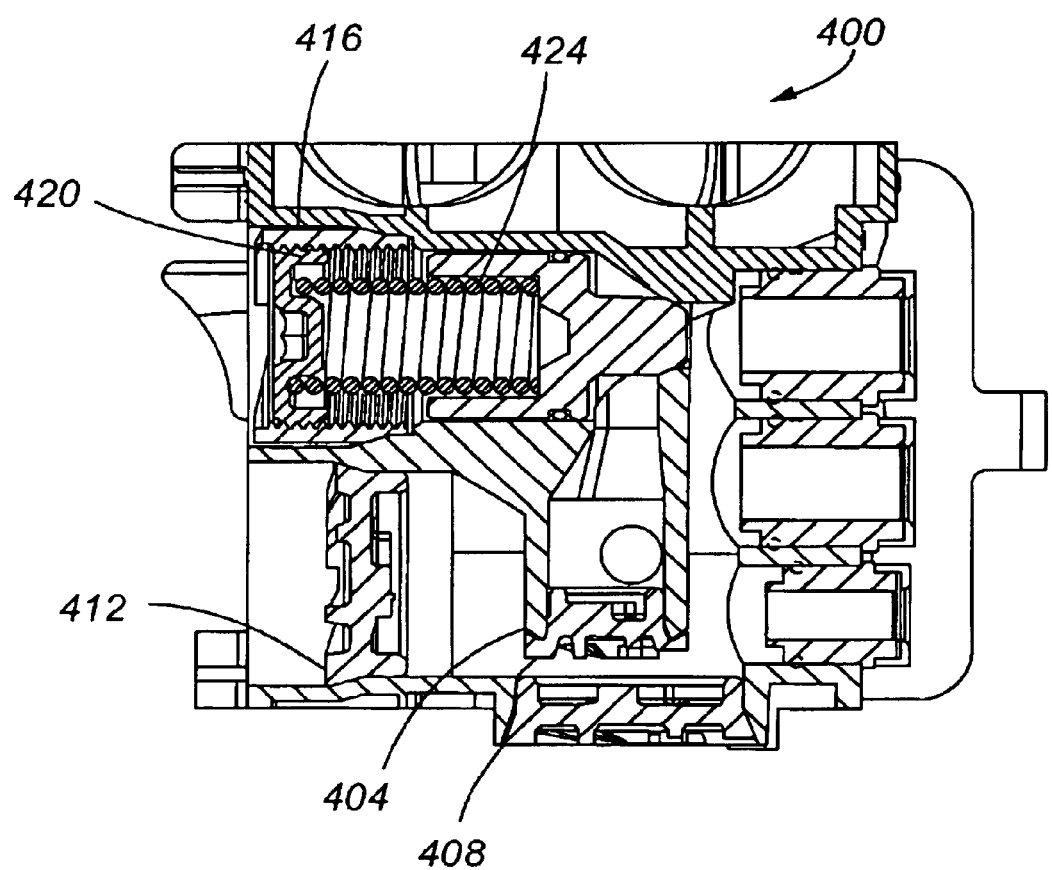
FIG. 18 is a sectional view of a valve assembly that has a number of members or plugs joined thereto.

One application or use of one or more members or plugs of the present invention is illustrated in FIG. 18. A valve assembly 400 has a number of portals or openings associated with fluid movement or passageways. Some of these are closed off using members or plugs of the present invention. More specifically, an internal member or plug 404 is joined to the valve assembly 400 by a known or conventional connection method, such as spin welding. A bottom member or plug 408 is also part of the valve assembly 400 and can be spin welded to the bottom of the valve assembly 400 or by some other suitable fastening technique. Similarly, the back member or plug 412 is joined at an opening in the valve assembly 400 in order to close it off, which joining is accomplished by spin welding or any other satisfactory fastening process. Additionally, a hollow and threaded member or plug 416 is joined, such as by spin welding, to an opening in the valve assembly 400. An adjusting plug 420 can threadably mate with the internal threads of the member 416 in order to close it off, as well as engage an end of a spring 424. Regarding the members 404, 408, 412, these are comparable to the member or plug 120 of FIGS. 5–7, although they can be of different sizes. In addition, the valve assembly 400 is only one example of the possible devices or assemblies with which one or more members or plugs of the present invention can be utilized. A variety of devices and assemblies can be provided for having one or more of the inventive members. Although it is preferred that each member be non-removably joined to a mating member or part in an automated manner, it should be understood that one or more members can be manually joined to a mating member or part using the same or different driving tools.

The foregoing description of the invention has been presented for the purposes of illustration and description and is not intended to limit the invention. Variations and modifications commensurate with the above description, together with the skill or knowledge of the relevant art, are within the scope of the present invention. The embodiments described herein are further intended to explain the best modes known for practicing the invention and to enable those skilled in the art to utilize the invention in such best modes or other embodiments, with the various modifications that may be required by the particular application or use of the invention. It is intended that the appended claims be construed to include alternative embodiments to the extent permitted by the prior art.

What is claimed is:

1. A member for joining to a mating member, comprising:
   a drive support having at least a first section border and a height;
   a drive having a profile joined to said drive support, said drive including a number of drive sections with each comprising:
   a drive face including a drive face wall and a drive face body, the drive face wall having a base;
   a flat positioned adjacent said base of said drive face wall; and
   a ramp.

2. The member of claim 1 wherein said drive is located at least along portions of said drive support first section border, the member having a total height defined by said drive support height and said drive profile and wherein said drive is engagable by a driver for rotating the member.

3. The member of claim 1 wherein said flat is positioned between said drive face wall base and said ramp.

4. The member of claim 1 wherein said drive support has a bounded segment defined within an inner edge of said drive, said bounded segment has a width and said drive face has a width and in which said drive face width is less than one-half said bounded segment width.

5. The member of claim 4 wherein said bounded segment is a closure that closes off the member.

6. The member of claim 1 wherein a center axis extends through a center of said drive support, said ramp has an angular extent extending from said center axis, said flat has an angular extent extending from said center axis and said drive face has an angular extent extending from said center axis, said ramp angular extent being greater than said drive face angular extent and said drive face angular extent being greater than said flat angular extent.

7. The member of claim 6 wherein said ramp angular extent is in the range of 35°–55°, said drive face angular extent is in the range of 30°–50° and said flat angular extent is in the range of 25°–45°.

8. The member of claim 7 wherein said ramp angular extent is about 45°, said drive face angular extent is about 40° and said flat angular extent is about 35°.

9. The member of claim 1 wherein said drive profile is less than one-half said drive support height.

10. The member of claim 1 wherein said number of drive sections is 3.

11. The member of claim 1 in combination with a driver having at least a first outer face that engages each of said number of drive sections.

12. The member of claim 1 wherein said drive support has a second section border and said drive includes an inner drive and an outer drive that is located radially outwardly from said inner drive, said inner drive is located at least along portions of said first section border and said outer drive is located at least along portions of said second section border.

13. The member of claim 11 defined as a first member and further comprising a second member that includes a drive and a drive support, said drive support of each of the first member and the second member has a center, said drive of the first member has an outer edge located at a first distance from its said drive support center and said drive of the second member has an outer edge located at a second distance from its said drive support center and in which said second distance is greater than said first distance.

14. The member of claim 1 in combination with a driver that includes an inner driver and an outer driver and in which said drive support has a bounded segment defined within an inner edge of said drive, said bounded segment being open for positioning at least portions of said inner driver through at least some of said bounded segment.

15. A member for joining to a part, comprising:
   a first portion and a second portion;
   the first portion having a first drive support having at least a first section border and a height and the second portion having a second drive support having at least a second section border and a height;
   said first portion having a first drive having a profile joined to said first drive support at least along portions of said first drive support first section border, said first portion having a total height defined by a combination of said first drive support height and said first drive profile, and said second portion having a second drive having a profile joined to said second drive support at least along portions of said second drive support second section border, said second member having a total height defined by a combination of said second drive support height and said second drive profile;
   said first drive support and said second drive support each having a common center, said first drive of the first portion having an outer edge located at a first distance from said center and said second drive of the second portion having an outer edge located at a second distance from said center and in which said second distance is greater than said first distance.

16. The member of claim 15 wherein said drive includes a number of drive sections with each having at least a drive face and a ramp and with said ramp being inclined relative to at least substantial portions of said drive face.

17. The member of claim 16 wherein each of said drive sections includes a flat adjacent to a drive face wall of said drive face, with said drive face wall extending substantially vertically.

18. The member of claim 16 in combination with a driver having a drive face that engages each of said number of drive sections.

19. The member of claim 15 wherein said first drive has a number of drive sections and said second drive also has a number of drive sections that are radially spaced from said drive sections of said first drive.

20. The member of claim 15 wherein said drive support has bounded portions that are open and the member is combined with a driver having portions thereof that extend inwardly of said bounded portions.

21. The member of claim 20 wherein said driver includes an inner driver and an outer driver.

22. The member of claim 1, wherein a portion of said first section border is tapered.

23. The member of claim 22, wherein the mating member comprises an aperture and said member is self-aligning with respect to said aperture.

24. The member of claim 2, wherein said driver contacts substantially all of each such drive face walls.

25. A plug for closing an aperture in a complementary member, comprising:
- a drive support having an exterior surface and a height;
- a drive extending from said drive support and including a number of drive sections, each comprising:
  - a drive face comprising a drive face wall;
  - a flat portion extending away from the base of said drive face wall;
  - a ramp adjoining said flat, wherein said exterior surface is tapered and said plug self-centers in the aperture.

* * * * *